(12) United States Patent  
Nishioki et al.

(10) Patent No.: US 6,507,404 B1  
(45) Date of Patent: Jan. 14, 2003

(54) METHOD AND APPARATUS FOR MEASURING OPTICAL WAVELENGTH

(75) Inventors: Nobuhisa Nishioki, Ibaraki (JP); Hirohisa Handa, Ibaraki (JP); Nobuhiro Ishikawa, Ibaraki (JP)

(73) Assignee: Mitutoyo Corporation, Kawasaki (JP)

( * ) Notice: Subject to any disclaimer, the term of this patent is extended or adjusted under 35 U.S.C. 154(b) by 266 days.

(21) Appl. No.: 09/614,604

(22) Filed: Jul. 12, 2000

(30) Foreign Application Priority Data

Jul. 14, 1999 (JP) .......................................... 11-200689

(51) Int. Cl.$^7$ .............................................. G02B 9/02
(52) U.S. Cl. ...................................... 356/450; 356/451
(58) Field of Search .................................. 356/450, 451

(56) References Cited

U.S. PATENT DOCUMENTS 4,052,129 A * 10/1977 Schawlow et al. ........... 356/451

OTHER PUBLICATIONS

K. B. Earnshaw et al., Two–Laser Optical Distance–Measuring Instrument that Corrects for the Atmospheric Index of Refraction, "Applies Optics" vol. 11, No. 4, Apr. 1972.

* cited by examiner

Primary Examiner—Samuel A. Turner
Assistant Examiner—Patrick Connolly
(74) Attorney, Agent, or Firm—Oliff & Berridge, PLC (57) ABSTRACT

An interference optical system (1) is employed to split an input light beam in two, giving a predetermined optical path length difference to the resultant two light beams and thereafter synthesizing them to generate interference fringes. A reference light with a known wavelength $\lambda 1$ is introduced into the interference optical system (1) from a coherent reference light source (2). A test light with an unknown wavelength $\lambda 2$ is simultaneously introduced into the interference optical system (1) from a coherent test light source (3) via a different optical path. The interference optical system (1) modulates both received signals obtained from the reference and test lights by giving the same variation to optical path length differences for the reference and test lights. Degrees of modulations of the received signals, obtained from the reference and test lights, depend on their wavelengths $\lambda 1$ and $\lambda 2$, respectively. Accordingly, the wavelength $\lambda 2$ of the test light can be computed by detecting the degrees of modulations of the received signals and using a ratio between the degrees of the wavelength $\lambda 1$ of the reference light.

16 Claims, 4 Drawing Sheets

METHOD AND APPARATUS FOR MEASURING OPTICAL WAVELENGTH

BACKGROUND OF THE INVENTION

1. Field of the Invention

The present invention relates to a method and apparatus for measuring an optical wavelength of a coherent light source for use in a lightwave interferometer that obtains various mechanical measures.

2. Description of the Related Art

To measure a wavelength of a coherent light source, a heterodyne method is generally used to detect a beat signal caused from an interference between a reference light with a known wavelength and another light with an unknown wavelength, which is subjected to testing (hereinafter referred to as "test light"). When two coherent lights with slightly different wavelengths are mixed to interfere with each other, the resultant beat signal has a frequency equal to a difference between frequencies of the two lights. Thus, if the wavelength of one light is previously known, the wavelength of the other light can be measured.

The wavelength measurement by the heterodyne method requires the two wavelengths to have extremely close values. For example, in order for suppressing a beat signal detected to have a frequency in an order of MHz, a difference between the wavelengths of two lights used is required to maintain 1 ppm or less. This causes a disadvantage that makes it impossible to adapt the heterodyne method to such a light that has a greatly different wavelength from that of the reference light.

The use of a variable wavelength coherent light source, such as a dye laser and a semiconductor laser, allows a variety of traceable lightwave interferometry that can not be achieved by a fixed wavelength light source. If the variable wavelength of the semiconductor laser and the like, for use in such the measurement, is an assumed value, it lacks traceability. Therefore, a technology for calibrating the wavelength of the variable wavelength semiconductor laser is preferable to employ a reference light such as a stabilized He-Ne laser to perform a precise calibration. The conventional heterodyne method, however, can not perform such the calibration.

SUMMARY OF THE INVENTION

The present invention has been made in consideration of the above situation and accordingly has an object to provide a method and apparatus for measuring an optical wavelength, capable of measuring a wavelength of a coherent light source having a wide range of wavelengths, using a reference light.

The present invention is provided with a method of measuring an optical wavelength using an interference optical system. The interference optical system splits an input light beam in two, gives a predetermined optical path length difference to the resultant two light beams and thereafter synthesizes them to generate interference fringes. The method comprises the steps of: introducing a reference light with a known wavelength $\lambda 1$ from a coherent reference light source into a first interference optical system; introducing a test light with an unknown wavelength $\lambda 2$ from a coherent test light source into a second interference optical system; modulating interference fringes obtained from the respective interference optical systems by giving the same variation to the respective optical path length differences for the reference and test lights in the first and second interference optical system; and computing the wavelength $\lambda 2$ of the test light by detecting degrees of modulation of the respective interference fringes and using a ratio between the degrees and the wavelength $\lambda 1$ of the reference light.

Unlike the heterodyne method that subjects the test light into a direct interference with the reference light, according to the present invention, the same optical path length variation is given both to the test and reference lights in the first and second interference optical systems to modulate the received signals of interference fringes, obtained from the test and reference lights, in accordance with their wavelengths. Through the use of this fact, the wavelength of the test light can be computed by detecting the degrees of the modulations.

Thus, the reference light is not required to have a wavelength close to that of the test light, allowing the wavelength measurement to be performed within a wide wavelength range.

Specifically, the first and second interference optical systems may preferably share components so as to configure a single interference optical system. In this case, the reference and test lights are introduced via separate optical paths into the single interference optical system.

In addition, there are several modes for modulating the reference and test lights through modulation of the optical path length differences, and for demodulating the modulated received signals and computing the wavelength as below:

(a) In a first mode, the respective received signals obtained from the reference and test lights are amplitude-modulated in accordance with wavelengths thereof by giving an increasing or decreasing displacement to the optical path length differences at a constant velocity as the variation given to the optical path length differences for said reference and test lights.

In this case, frequencies f1 and f2 of intensity variations of amplitude-modulation received signals obtained from the reference and test lights are detected, and the wavelength $\lambda 2$ of the test light is computed from $\lambda 2=(f1/f2)\lambda 1$.

(b) In a second mode, the respective received signals obtained from the reference and test lights are phase-modulated in accordance with wavelengths thereof by giving a sinusoidal wave vibration having a predetermined amplitude of d and an angular frequency as the variation given to the optical path length differences for the reference and test lights.

In this case, phase-modulated received signals from the reference and test lights are PM demodulated to detect phase terms, $\Psi 1=(2\pi d/\lambda 1)+\phi 1$ and $\Psi 2=(2\pi d/\lambda 2)+\phi 2$ (where $\phi 1$ and $\phi 2$ are initial phase magnitudes), and a ratio between amplitudes of the phase terms, $\lambda 2/\lambda 1$, is computed to obtain the wavelength $\lambda 2$ of the test light.

(c) In a third mode, the respective received signals obtained from the reference and test lights are frequency-modulated in accordance with wavelengths thereof, by giving a sinusoidal wave vibration having a predetermined amplitude of d and an angular frequency of $\omega$ both on optical path length differences for the reference and test lights, and simultaneously superimposing an interfered beat signal with an angular frequency of $\omega c$ on the received signals obtained from the reference and test lights in an acoustic optical modulator (AOM) disposed on the optical paths.

In this case, frequency-modulated received signals from the reference and test lights are FM demodulated, using a carrier frequency of $\omega c$, to detect phase terms, $\Psi 1=(2\pi d/$ $\lambda 1)+\phi 1$ and $\Psi 2=(2\pi d/\lambda 2)+\phi 2$ (where $\phi 1$ and $\phi 2$ are initial phase magnitudes), and a ratio between amplitudes of the phase terms, $\lambda 2/\lambda 1$, is computed to obtain the wavelength $\lambda 2$ of the test light.

The sinusoidal wave vibration may be given to the optical path length differences for the reference and test lights through electrical modulation by an electric optical modulation (EOM) as well as a mechanical method that gives a signal to a mirror and the like in the interference optical system using a piezoelectric device and the like.

The present invention is also provided with an apparatus for measuring an optical wavelength using an interference optical system. The interference optical system splits an input light beam in two, gives a predetermined optical path length difference to the resultant two light beams and thereafter synthesizes them to generate interference fringes. The apparatus comprises a first interference optical system for receiving a reference light with a known wavelength $\lambda 1$ from a coherent reference light source; a second interference optical system for receiving a test light with an unknown wavelength $\lambda 2$ from a coherent test light source; a modulator for modulating interference fringes obtained from the respective interference optical systems by giving the same variation to the respective optical path lengths for the reference and test lights in the first and second interference optical system; a first photoreceptive device for receiving interference fringes output from the first interference optical system; a second photoreceptive device for receiving interference fringes output from the second interference optical system; and a wavelength calculator for computing the wavelength $\lambda 2$ of the test light, by detecting degrees of modulations of the received signals obtained from the reference and test lights at the first and second photoreceptive devices and using a ratio between the degrees and the wavelength $\lambda 1$ of the reference light. In this case, preferably the first and second interference optical systems may share components so as to configure a single interference optical system, and the reference and test lights are preferably introduced via separate optical paths into the single interference optical system.

The modulator and the wavelength calculator for processing the output from the modulator to compute the wavelength may also be configured specifically in accordance with the modes (a)–(c) above described. Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

First Embodiment

Figure 1:
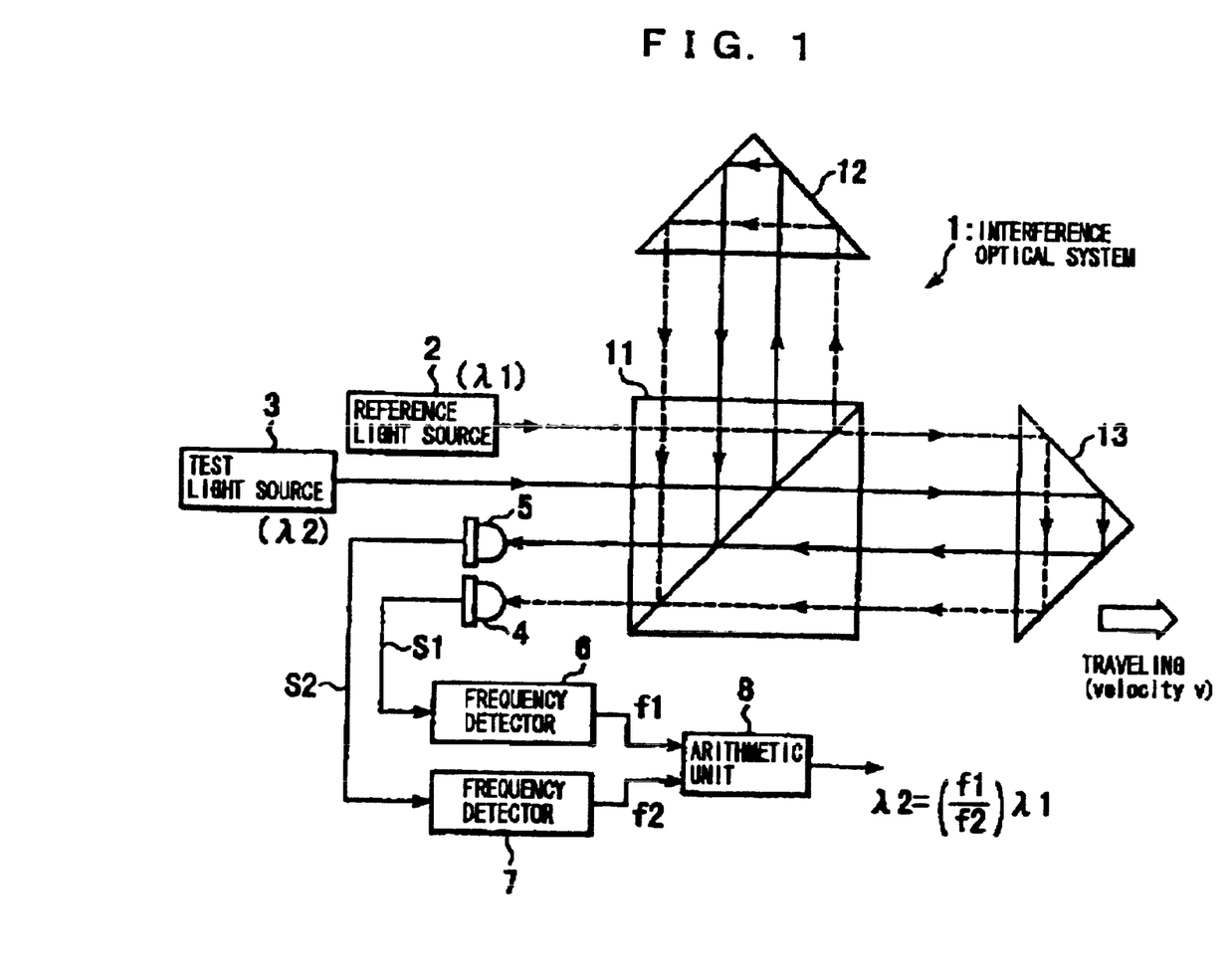
FIG. 1 is a diagram showing an arrangement of an apparatus for measuring an optical wavelength according to a first embodiment of the present invention.

FIG. 1 shows a method and apparatus for measuring an optical wavelength according to a fundamental embodiment of the present invention. An interference optical system 1 comprises a beam splitter 11 for splitting an input light beam in two, and mirrors 12 and 13 for giving a difference in length between optical paths for the resultant two split light beams and returning them to the beam splitter 11. The mirror 12 is stationary and the other mirror 13 is movable. The two light beams returned to the same point in the beam splitter 11 are synthesized to generate interference fringes that correspond to the optical path length difference between the two light beams. The difference is determined from the location of the mirror 13.

A reference light with a known wavelength $\lambda 1$ from a reference light source 2 and a test light with an unknown wavelength $\lambda 2$ from a test light source 3 are introduced into the interference optical system 1 via different optical paths. The reference light source 2 comprises a semiconductor laser having a previously known oscillation wavelength or a He-Ne laser having a stabilized oscillation wavelength, for example. The test light source 3 comprises a semiconductor laser that has an oscillation wavelength variable with an injection current. The oscillation wavelength is, however, not known when a certain injection current is given. Photoreceptive devices 4 and 5 receive interference fringes that are obtained from the reference and test lights in the interference optical system 1, respectively. When the mirror 13 is shifted at a traveling velocity of v, a difference between optical path lengths is modulated. As a result, the signals received at the photoreceptive devices 4 and 5 appear as amplitude-modulated sinusoidal wave signals that vary their intensities at a certain frequency.

The interference optical system 1 has separate optical paths for the reference and test lights, and may also be prepared as individual interference optical systems for the reference and test lights in principle. In the present invention, however, the same modulation is added to the optical path lengths for the reference and test lights, as described later. Accordingly, in this embodiment, two coherent optical paths are not separated physically and are configured as the integrated interference optical system 1 that shares components including the beam splitter 11 and mirrors 12, 13 for the reference and test lights.

In the interference optical system 1 of FIG. 1, the optical path length variation when the mirror 13 is displaced is double the displacement of the mirror 13. Accordingly, frequencies of intensity variations, f1 and f2, of the received signals obtained from the reference and control lights are respectively presented by $f1=2v/\lambda 1$ and $f2=2v/\lambda 2$ using their wavelengths $\lambda 1$ and $\lambda 2$. When a ratio between these frequencies f1 and f2 is measured, the wavelength $\lambda 2$ of the test light can be computed using the wavelength $\lambda 1$ of the reference light. Namely, the wavelength $\lambda 2$ can be computed by detecting the frequencies f1 and f2 of the intensity variation of the two received signals at frequency detectors 6 and 7, respectively, and performing an arithmetic operation of $\lambda 2=(f1/f2)\lambda 1$ at an arithmetic unit 8.

As obvious from the embodiment described above, the optical path lengths for the reference and test lights are modulated simultaneously through the scanning of the movable mirror 13. Accordingly, with the use of the difference between degrees of modulations of the received signals due to different wavelengths, the wavelength of the test light can be identified. Therefore, if the wavelength of the test light is far apart from the wavelength of the reference light, no problem occurs and wavelengths can be measured within a wide wavelength range.

In the method of the first embodiment, however, scanning the movable mirror 13 in one direction at a constant velocity requires a large displacement in distance. A driving method of displacing the mirror reciprocally within a certain range is also considered. In this method, however, pulse vibrations are imparted on the mirror by inertia when the mirror is turned. To eliminate the influence from the above pulse vibrations requires scanning the mirror at a lower velocity. This invites a reduction in the measurement ability.

Second Embodiment

Figure 2:
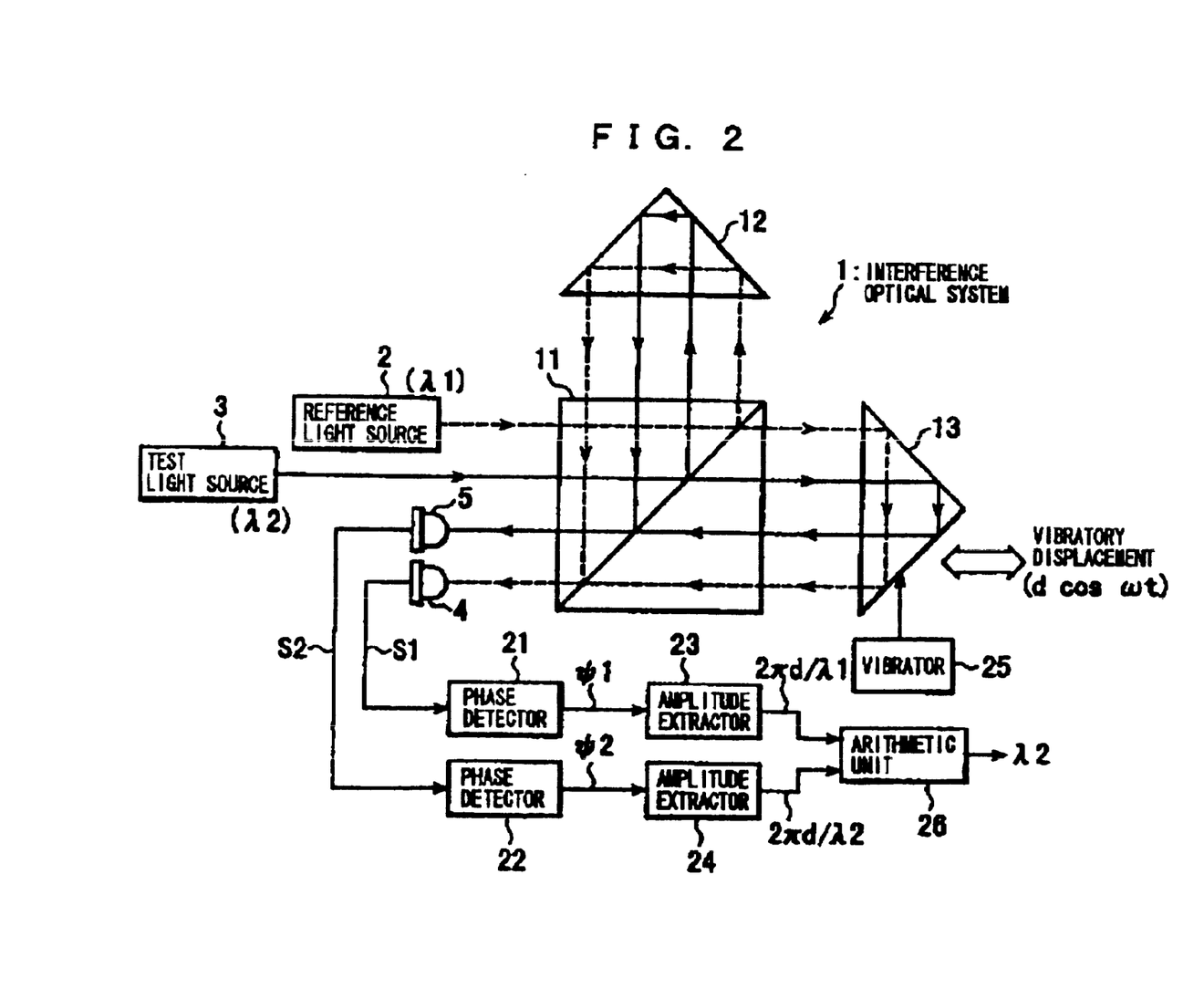
FIG. 2 is a diagram showing an arrangement of an apparatus for measuring an optical wavelength according to a second embodiment of the present invention.

FIG. 2 shows a measurement method and apparatus arrangement of a more preferable embodiment. The optical system has the same arrangement as that in FIG. 1 essentially. In this embodiment a vibrator 25 imparts micro-vibratory displacements on the movable mirror 13. A piezoelectric device is specifically employed for the vibrator 25 to vibrate the mirror 13 with an amplitude of d at an angular frequency of $\omega$.

When photoreceptive devices 4 and 5 receive the reference (wavelength $\lambda 1$) and test (wavelength $\lambda 2$) lights respectively, they output received signals S1 and S2, which are phase-modulated (PM) in sinusoidal waves accordance to their wavelengths, as represented by the following equations (1):

$$S1=A1+B1\ \cos\{(2\pi d/\lambda 1)\cos\ \omega t+\phi 1\}$$

$$S2=A2+B2\ \cos\{(2\pi d/\lambda 2)\cos\ \omega t+\phi 2\} \quad (1)$$

where A1, A2 denote DC components; B1, B2 amplitudes; and $\phi 1$, $\phi 2$ initial phase magnitudes.

When known phase detectors 21 and 22 demodulate (PM demodulate) thus obtained received signals S1 and S2, they output phase signals $\Psi 1$ and $\Psi 2$, respectively, represented by the following equation (2):

$$\Psi 1=(2\pi d/\lambda 1)\cos\ \omega t+\phi 1$$

$$\Psi 2=(2\pi d/\lambda 2)\cos\ \omega t+\phi 2 \quad (2)$$

Amplitude extractors 23 and 24 extract amplitudes, $p1=2\pi d/\lambda 1$ and $p2=2\pi d/\lambda 2$, from these phase signals $\Psi 1$ and $\Psi 2$. An arithmetic unit 26, computing a ratio of amplitudes, p1/p2, and multiplying the ratio by the wavelength $\lambda 1$ of the reference light, computes the wavelength $\lambda 2$ of the test light from $\lambda 2=(p1/p2)\lambda 1$.

According to this embodiment, with the use of the sinusoidal-wave phase modulation method that imparts micro-vibrations on the movable mirror 13 in the interference optical system 1, the wavelength of the test light can be measured. The micro-vibrations can be easily imparted on the mirror 13 using a piezoelectric device and the like. Thus, a practical wavelength measurement can be achieved.

Third Embodiment

Figure 3:
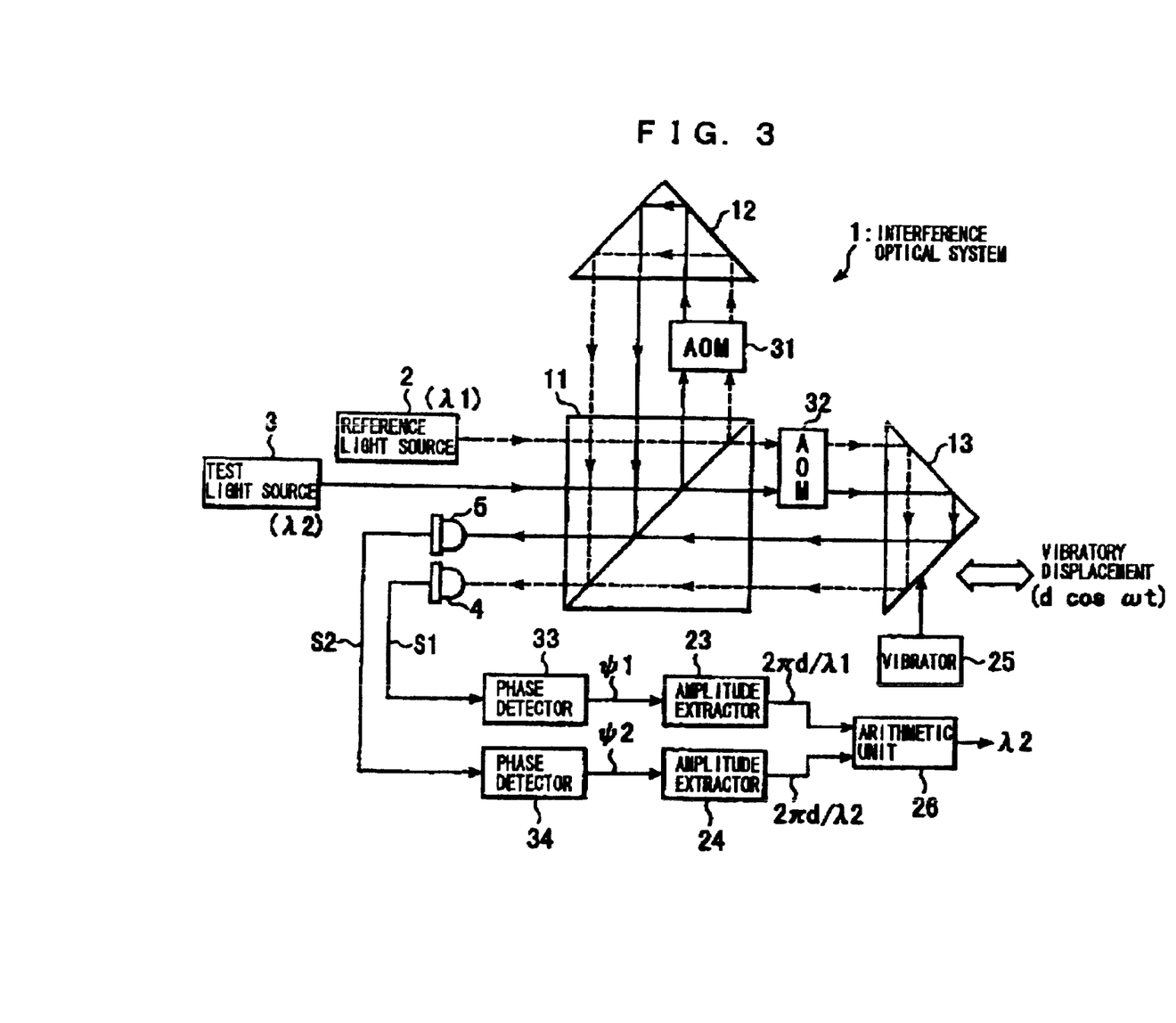
FIG. 3 is a diagram showing an arrangement of an apparatus for measuring an optical wavelength according to a third embodiment of the present invention.

FIG. 3 shows another embodiment that employs an additional frequency modulation (FM) method in combination with the sinusoidal-wave phase modulation (PM) method of the second embodiment. In the third embodiment, acoustic optical modulators (AOMs) 31 and 32 are interposed at some midpoints in the optical paths, as the modulator for modulating the optical path length difference, in the interference optical system 1. As shown in FIG. 3, the first AOM 31 is located on the forward path between the beam splitter 11 and the mirror 12 and the second AOM 32 on the forward path between the beam splitter 11 and the mirror 13.

When the AOMs 31 and 32 are driven under such the arrangement, unlike the system that employs the mechanical vibrations, an interfered beat signal can be generated in an order of 0.1–10 MHz, regardless to the wavelengths of the reference and control lights. For example, the first AOM 31 is driven with an angular frequency of $\omega c1$ and the second AOM 32 with an angular frequency of $\omega c2$. As a result, an interfered beat signal with $\omega c=\omega c1-\omega c2$, which corresponds to the difference between the angular frequencies $\omega c1$ and $\omega c2$, is superimposed both on the signals S1 and S2 received at the photoreceptive devices 4 and 5, as represented by the following equations (3):

$$S1=A1+B1\ \cos\{\omega ct+(2\pi d/\lambda 1)\cos\ \omega t+\phi 1\}$$

$$S2=A2+B2\ \cos\{\omega ct+(2\pi d/\lambda 2)\cos\ \omega t+\phi 2\} \quad (3)$$

The signals S1 and S2 are frequency-modulated with a carrier frequency of $\omega c$, with the exception of the bias component A1 and A2 from the above equation. Phase detectors 33 and 34 FM demodulate these received signals S1 and S2, respectively. Thus, similar to those represented by the equation (2) shown in the preceding embodiment, phase signals $\Psi 1$ and 105 2 are obtained from the respective received signals S1 and S2. Phase extractors 23 and 24 extract amplitudes, $p1=2\pi d/\lambda 1$ and $p2=2\pi d/\lambda 2$, from these phase signals $\Psi 1$ and $\Psi 2$ in the same manner as in the second embodiment. Through the operation of computing the ratio of amplitudes, p1/p2 and multiplication by the wavelength $\lambda 1$ at the arithmetic unit 26, the wavelength $\lambda 2$ of the test light can computed from $\lambda 2=(p1/p2)\lambda 1$.

According to this embodiment, the interfered beat signal caused by the AOM can be designed to have a sufficiently higher angular frequency $\omega c$ than the angular frequency $\omega$ by the mechanical vibration. As a result, the above phase term can be detected through FM demodulation at a high precision and speed. The use of the phase and frequency modulations in combination can prevent variations of the initial phases $\phi 1$, $\phi 2$ and light intensity amplitudes B1, B2 from effecting on the system. In other words, it can perform the wavelength measurement can be achieved without affection from fluctuations of temperature and air. Particularly, in the system that employs a semiconductor laser for the test light source 3, the light intensity variation occurs when the oscillation wavelength varies. Though the system can still measure the wavelength at a high precision without affection from such the light intensity variation.

Fourth Embodiment

Figure 4:
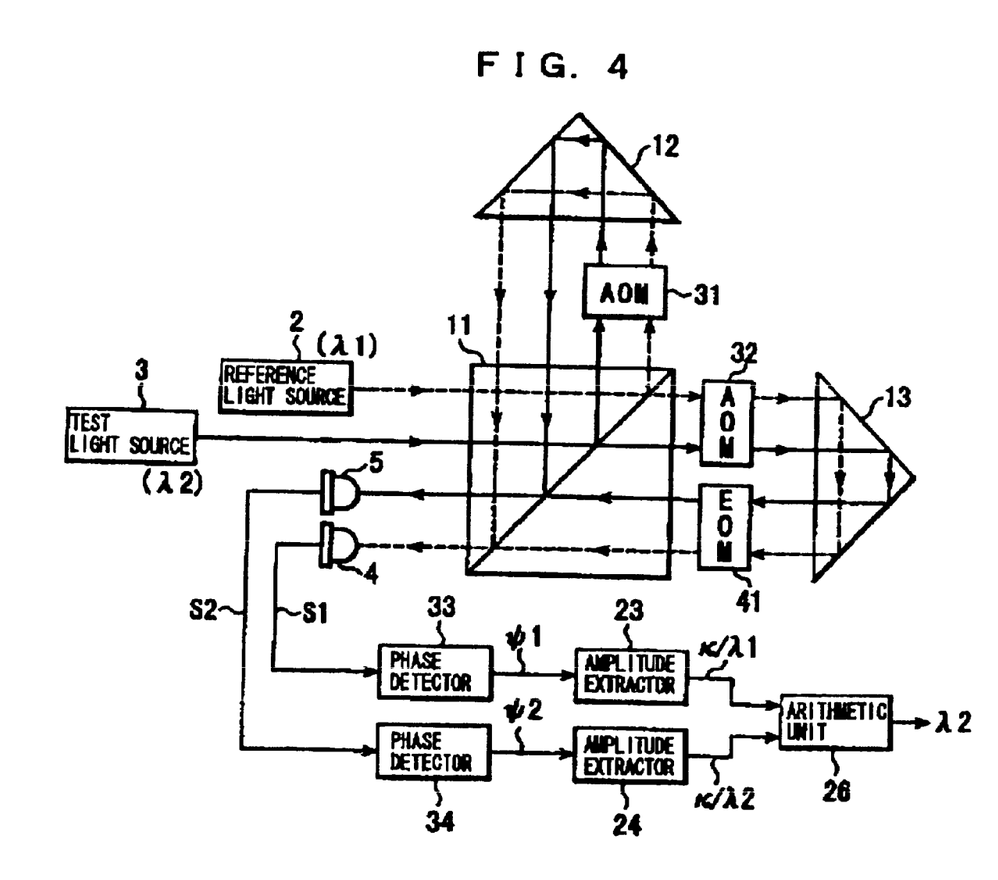
FIG. 4 is a diagram showing an arrangement of an apparatus for measuring an optical wavelength according to a fourth embodiment of the present invention.

FIG. 4 shows a fourth, alternative embodiment of the third embodiment, which electrically modulates the optical path length difference, rather mechanically modulating the optical path length difference by vibrating the mirror 13. For this purpose, an electric optical modulator (EOM) 41 is disposed on the return path between the beam splitter 11 and the mirror 13. A driving signal in the form of sinusoidal wave is supplied to the EOM 41. The EOM 41 exhibits a refractive index variation in response to an electric field application. Thus, driving the EOM 41 with a sinusoidal wave signal is equivalent to give a sinusoidal wave variation to the optical path length difference in the interference optical system 1. The AOMs 31 and 32 are driven in the same manner as in the third embodiment.

Thus, the signals S1 and S2 received at the photoreceptive devices 4 and 5 are frequency-modulated as represented by the following equation (4):

$$S1=A1+B1\ \cos\{\omega ct+(k/\lambda 1)\cos\ \omega t+\phi 1\}$$

$$S2=A2+B2\ \cos\{\omega ct+(k/\lambda 2)\cos\ \omega t+\phi 2\} \quad (4)$$

where k denotes an apparent variation of the optical path length caused by the EOM 41 driving.

Phase detectors 33 and 34 FM-demodulate the received signals S1 and S2 in the same manner as in the third embodiment. Thus, phase signals, $\Psi 1=(k/\lambda 1)\cos \omega t+\phi 1$ and $\Psi 2=(k/\lambda 2)\cos \omega t+\phi 2$, are obtained. Amplitudes, $p1=k/\lambda 1$ and $p2=k/\lambda 2$, of these phase signals $\Psi 1$ and $\Psi 2$ are extracted by amplitude extractors 23 and 24. Through the multiplication of the ratio p1/p2 by the wavelength $\lambda 1$ at the arithmetic unit 26, the wavelength $\lambda 2$ of the test light can be computed from $\lambda 2=(p1/p2)\lambda 1$.

The method of imparting mechanical vibrations on the mirror has the upper limit in the modulation frequency due to the inherent vibration of the mechanism. It is generally limited to an order of kHz. To the contrary, the method that employs the EOM 41, like this embodiment, can achieve the similar phase modulation as an extremely higher frequency, for example, up to GHz order. Accordingly, this embodiment can perform a much faster and more stable wavelength measurement. In addition, due to the fastness of the EOM, driving with a triangular wave signal can achieve the same action as giving an addition or reduction in the optical path length at a constant velocity within a certain period.

The wavelength measurement method of the present invention can be applied to stabilize a variable-wavelength light source that employs a semiconductor laser. The semiconductor laser can vary its wavelength in accordance with the injection current. The output from the semiconductor laser is modulated, by modulating the optical path length in the interference optical system as in the above embodiment, and the injection current is feedback controlled so that the demodulated output can maintain a constant level. Thus, a stabilized variable-wavelength light source can be realized so as to perform a stabilized oscillation with a wavelength determined from the demodulated level designated within a range that does not cause a mode hopping, for example.

As obvious from the above, through the use of a combination of an interference optical system and a modulator for modulating optical path lengths thereof, the present invention can provide a method and apparatus for measuring an optical wavelength, capable of measuring a wavelength of a coherent light source having a wide range of wavelengths, using a reference light.

What is claimed is:

1. A method of measuring an optical wavelength using an interference optical system, said interference optical system splitting an input light beam in two, giving a predetermined optical path length difference to the resultant two light beams and thereafter synthesizing them to generate interference fringes, said method comprising the steps of:

introducing a reference light with a known wavelength $\lambda 1$ from a coherent reference light source into a first interference optical system;

introducing a test light with an unknown wavelength $\lambda 2$ from a coherent test light source into a second interference optical system;

modulating interference fringes obtained from the respective interference optical systems by giving a same sinusoidal wave vibration having a predetermined amplitude of d and an angular frequency $\omega$ to the respective optical path length differences for said reference and test lights in said interference optical systems; and computing said wavelength $\lambda 2$ of said test light by detecting degrees of modulations of the respective interference fringes obtained for said reference and test lights and using a ratio between said degrees and said wavelength $\lambda 1$ of said reference light.

2. The method of measuring an optical wavelength according to claim 1, wherein said first and second interference optical systems share components so as to configure a single interference optical system, said reference and test lights being introduced via separate optical paths into said single interference optical system.

3. The method of measuring an optical wavelength according to claim 1, said step of modulating including:

phase-modulating said interference fringes for said reference and test lights in accordance with wavelengths thereof by giving a sinusoidal wave vibration having a predetermined amplitude of d and an angular frequency as said variation, and said step of computing including:

PM demodulating phase-modulated received signals obtained from said reference and test lights to detect phase terms, $\Psi 1=(2\pi d/\lambda 1)+\phi 1$ and $\Psi 2=(2\pi d/\lambda 2)+\phi 2$ (wherein $\phi 1$ and $\phi 2$ are initial phase magnitudes), and computing a ratio between amplitudes of said phase terms, $\lambda 2/\lambda 1$, to obtain said wavelength $\lambda 2$ of said test light.

4. The method of measuring an optical wavelength according to claim 2, said step of modulating including:

phase-modulating said interference fringes for said reference and test lights in accordance with wavelengths thereof by giving a sinusoidal wave vibration having a predetermined amplitude of d and an angular frequency as said variation, and said step of computing including:

PM demodulating phase-modulated received signals obtained from said reference and test lights to detect phase terms, $\Psi 1=(2\pi d/\lambda 1)+\phi 1$ and $\Psi 2=(2\pi d/\lambda 2)+\phi 2$ (where $\phi 1$ and $\phi 2$ are initial phase magnitudes), and computing a ratio between amplitudes of said phase terms, $\lambda 2/\lambda 1$, to obtain said wavelength $\lambda 2$ of said test light.

5. The method of measuring an optical wavelength according to claim 1, said step of modulating including:

frequency-modulating said interference fringes for said reference and test lights in accordance with wavelengths thereof, by giving a sinusoidal wave vibration having a predetermined amplitude of d and an angular frequency of $\omega$ both on optical path length differences for said reference and test lights and simultaneously superimposing an interfered beat signal with an angular frequency of $\omega c$ on said interference fringes for said reference and test lights in an acoustic optical modulators disposed on said optical paths, and said step of computing including:

FM demodulating frequency-modulated received signals obtained from said reference and test lights using a carrier frequency of $\omega c$ to detect phase terms, $\Psi 1=(2\pi d/\lambda 1)+\phi 1$ and $\Psi 2=(2\pi d/\lambda 2)+\phi 2$ (where $\phi 1$ and $\phi 2$ are initial phase magnitudes); and computing a ratio between amplitudes of said phase terms, $\lambda 2/\lambda 1$, to obtain said wavelength $\lambda 2$ of said test light.

6. The method of measuring an optical wavelength according to claim 2, said step of modulating including:

frequency-modulating said interference fringes for said reference and test lights in accordance with wavelengths thereof, by giving a sinusoidal wave vibration having a predetermined amplitude of d and an angular frequency of $\omega$ both on optical path length differences for said reference and test lights and simultaneously superimposing an interfered beat signal with an angular frequency of $\omega c$ on said interference fringes for said reference and test lights in an acoustic optical modulation disposed on said optical paths, and said step of computing including:

FM demodulating frequency-modulated received signals obtained from said reference and test lights using a carrier frequency of $\omega c$ to detect phase terms, $\Psi 1=(2\pi d/\lambda 1)+\phi 1$ and $\Psi 2=(2\pi d/\lambda 2)+\phi 2$ (where $\phi 1$ and $\phi 2$ are initial phase magnitudes); and computing a ratio between amplitudes of said phase terms, $\lambda 2/\lambda 1$, to obtain said wavelength $\lambda 2$ of said test light.

7. The method of measuring an optical wavelength according to claim 5, wherein said sinusoidal wave vibration is given to said optical path length differences for said reference and test lights through electrical modulation by an electric optical modulator.

8. The method of measuring an optical wavelength according to claim 6, wherein said sinusoidal wave vibration is given to said optical path length differences for said reference and test lights through electrical modulation by an electric optical modulator.

9. An apparatus for measuring an optical wavelength using an interference optical system, said interference optical system splitting an input lght beam in two, giving a predetermined optical path length difference to the resultant two light beams and thereafter synthesizing them to generate interference fringes, said apparatus comprising:

a first interference optical system for receiving a reference light with a known wavelength $\lambda 1$ from a coherent reference light source;

a second interference optical system for receiving a test light with an unknown wavelength $\lambda 2$ from a coherent test light source;

a modulator for modulating interference fringes obtained for said reference and test lights by giving a same sinusoidal wave vibration having a predetermined amplitude of d and an angular frequency $\omega$ the respective optical path length differences for said reference and test lights in said first and second interference optical systems;

a first photoreceptive device for receiving the interference fringes output from said first interference optical system;

a second photoreceptive device for receiving the interference fringes output from said interference optical system; and a wavelength calculator for computing said wavelength $\lambda 2$ of said test light, by detecting degrees of modulations of the respective received signals obtained for said reference and test lights at said first and second photoreceptive devices and using a ratio between said degrees and said wavelength $\lambda 1$ of said reference light.

10. The apparatus for measuring an optical wavelength according to claim 9, wherein said first and second interference optical systems share components so as to configure a single interference optical system, said reference and test lights being introduced via separate optical paths into said single interference optical system.

11. The apparatus for measuring an optical wavelength according to claim 9, wherein said modulator phase-modulates said interference fringes obtained for said reference and test lights in accordance with wavelengths thereof by giving a sinusoidal wave vibration having a predetermined amplitude of d and an angular frequency as said variation, and said wavelength calculator including:

phase detectors for PM demodulating phase-modulated received signals obtained from said reference and test lights to detect phase terms, $\Psi 1=(2\pi d/\lambda 1)+\phi 1$ and $\Psi 2=(2\pi d/\lambda 2)+\phi 2$ (where $\phi 1$ and $\phi 2$ are initial phase magnitudes);

amplitude extractors for extracting amplitudes, $2\pi d/\lambda 1$ and $2\pi d/\lambda 2$, of phase terms obtained by said phase detectors; and an arithmetic unit for computing a ratio between amplitudes of said phase terms, $\lambda 2/\lambda 1$, to obtain said wavelength $\lambda 2$ of said test light.

12. The apparatus for measuring an optical wavelength according to claim 10, wherein said modulator phase-modulates said interference fringes obtained for said reference and test lights in accordance with wavelengths thereof by giving a sinusoidal wave vibration having a predetermined amplitude of d and an angular frequency as said variation, and said wavelength calculator including:

phase detectors for PM demodulating phase-modulated received signals obtained from said reference and test lights to detect phase terms, $\Psi 1=(2\pi d/\lambda 1)+\phi 1$ and $\Psi 2=(2\pi d/\lambda 2)+\phi 2$ (where $\phi 1$ and $\phi 2$ are initial phase magnitudes);

amplitude extractors for extracting amplitudes, $2\pi d/\lambda 1$ and $2\pi d/\lambda 2$, of phase terms obtained by said phase detectors; and an arithmetic unit for computing a ratio between amplitudes of said phase terms, $\lambda 2/\lambda 1$, to obtain said wavelength $\lambda 2$ of said test light.

13. The apparatus for measuring an optical wavelength according to claim 9, wherein said modulator frequency-modulates said interference fringes obtained for said reference and test lights in accordance with wavelengths thereof, by giving a sinusoidal wave vibration having a predetermined amplitude of d and an angular frequency of $\omega$ both on optical path length differences for said reference and test lights and simultaneously superimposing an interfered beat signal with an angular frequency of $\omega c$ on said interference fringes obtained for said reference and test lights in an acoustic optical modulator disposed on said optical paths, and said wavelength calculator including:

phase detectors for FM demodulating frequency-modulated received signals obtained from said reference and test lights using a carrier frequency of $\omega c$ to detect phase terms, $\Psi 1=(2\pi d/\lambda 1)+\phi 1$ and $\Psi 2=(2\pi d/\lambda 2)+\phi 2$ (where $\phi 1$ and $\phi 2$ are initial phase magnitudes);

amplitude extractors for extracting amplitudes, $2\pi d/\lambda 1$ and $2\pi d/\lambda 2$, of phase terms obtained by said phase detectors; and an arithmetic unit for computing a ratio between amplitudes of said phase terms, $\lambda 2/\lambda 1$, to obtain said wavelength $\lambda 2$ of said test light.

14. The apparatus for measuring an optical wavelength according to claim 10, wherein said modulator frequency-modulates said interference fringes obtained for said reference and test lights in accordance with wavelengths thereof, by giving a sinusoidal wave vibration having a predetermined amplitude of d and an angular frequency of $\omega$ both on optical path length differences for said reference and test lights, and simultaneously superimposing an interfered beat signal with an angular frequency of $\omega c$ on said interference fringes obtained for said reference and test lights in an acoustic optical modulator disposed on said optical paths, and said wavelength calculator including:

phase detectors for FM demodulating frequency-modulated received signals obtained from said reference and test lights using a carrier frequency of $\omega c$ to detect phase terms, $\Psi1=(2\pi d/\lambda 1)+\phi 1$ and $\Psi 2=(2\pi d/\lambda 2)+\phi 2$ (where $\phi 1$ and $\phi 2$ are initial phase magnitudes);

amplitude extractors for extracting amplitudes $2\pi d/\lambda 1$ and $2\pi d/\lambda 2$, of phase terms obtained by said phase detectors; and an arithmetic unit for computing a ratio between amplitudes of said phase terms, $\lambda 2/\lambda 1$, to obtain said wavelength $\lambda 2$ of said test light.

15. The apparatus for measuring an optical wavelength according to claim 13, wherein said modulator includes an electric optical modulator for giving said sinusoidal wave vibration to said optical path length differences for said reference and test lights.

16. The apparatus for measuring an optical wavelength according to claim 14, wherein said modulator includes an electric optical modulator for giving said sinusoidal wave vibration to said optical path length differences for said reference and test lights.

* * * * *